United States Patent [19]
Arakawa et al.

[11] Patent Number: 4,942,496
[45] Date of Patent: Jul. 17, 1990

[54] CERAMIC CAPACITOR AND MANUFACTURING METHOD THEREOF

[75] Inventors: Hajime Arakawa; Osamu Yamaoka; Kazuyuki Kubota; Motoaki Kakio; Yoshimasa Azuma; Mitsuru Nagashima, all of Nagaokakyo, Japan

[73] Assignee: Murata Manufacturing Co., Ltd., Japan

[21] Appl. No.: 316,653

[22] Filed: Feb. 28, 1989

[30] Foreign Application Priority Data

Feb. 29, 1988 [JP] Japan .................................. 63-47765

[51] Int. Cl.$^5$ ........................ H01G 4/10; H01G 7/00
[52] U.S. Cl. ............................................ 361/321; 29/25.42
[58] Field of Search ................ 361/320, 321; 29/25.42

[56] References Cited

U.S. PATENT DOCUMENTS

| | | | |
|---|---|---|---|
| 2,997,635 | 8/1961 | Robinson | 361/321 X |
| 3,426,250 | 2/1969 | Kahn | 361/321 |
| 3,426,251 | 2/1969 | Prokopowicz | 361/321 |
| 4,205,364 | 5/1980 | Pereira | 361/321 X |
| 4,571,276 | 2/1986 | Akse | 361/320 X |

FOREIGN PATENT DOCUMENTS

| | | | |
|---|---|---|---|
| 1166377 | 3/1964 | Fed. Rep. of Germany | 361/321 |
| 89963 | 8/1978 | Japan | 361/321 |
| 167318 | 12/1981 | Japan | 361/321 |
| 982120 | 2/1965 | United Kingdom | 361/321 |

*Primary Examiner*—Donald A. Griffin
*Attorney, Agent, or Firm*—Ostrolenk, Faber, Gerb & Soffen

[57] ABSTRACT

A ceramic capacitor comprising a dielectric ceramic element made of materials a metal oxide as the principal ingredient. On the surface of the dielectric ceramic element are formed a plurality of electrodes. The materials used for the electrode are selected such that their principal ingredients have a stronger oxidizing tendency than those used for the dielectric ceramic element. The electrode is formed by applying this electrode material on the surface of the dielectric ceramic element and subsequently baking in a non-reducing atmosphere. This process reduces the surface of the dielectric ceramic element underneath the electrode and a reduced layer is thus formed.

11 Claims, 3 Drawing Sheets

CERAMIC CAPACITOR AND MANUFACTURING METHOD THEREOF

BACKGROUND OF THE INVENTION

1. Field of the Invention

The present invention relates to a ceramic capacitor and a manufacturing method thereof and in particular to a ceramic capacitor for high voltage applications and a manufacturing method thereof.

2. Prior Art

A conventional ceramic capacitor 1 is known, for example, as shown in FIG. 4, which is made by forming an electrode 3 on both principal surfaces of a dielectric ceramic element 2 based on barium titanate or strontium titanate. This electrode 3 is formed on both principal surface by applying, for example, silver paste on both principal surfaces of the dielectric ceramic element 2 and subsequently baking it.

FIG. 5A is an illustrative view showing the cruving of the equipotential surfaces in the vicinity of the edge portion of the ceramic capacitor. As seen from FIG. 5A, the potential inclination is increased in the vicinity of the edge portion of the electrode and the electric lines of force are concentrated. Hence, when a high voltage is applied, dielectric breakdown is likely to take place between the edge portions of both electrodes.

In order to prevent such concentration of electric lines of force in the vicinity of the electrode, it is conceivable of form both electrodes to entirely both principal surfaces. In this case, the state of the equipotential surfaces is shown in FIG. 5B, wherein the potential inclination in the vicinity of the edge portion of the electrode is definitely less than that shown in FIG. 5A. Hence, dielectric breakdown between the edge portions of both electrodes of the dielectric ceramic element in the edge portion is less likely to take place, and the dielectric breakdown voltage of the ceramic capactior can be increased. In our experiment, too, as shown in FIG. 6, it was confirmed that the shorter the distance between the end (edge) of the dielectric ceramic element and the end (edge) of the electrode, the larger the dielectric breakdown voltate.

When, however, the electrodes are formed on both entire main surfaces of the dielectric ceramic element, it is difficult to maintain the ideal potential inclination. This problem may result in lowering of the dielectric breakdown voltage, if for example the edge portion of the ceramic capacitor should be chipped off or cracks should be formed therein. Also, when the electrode is formed by coating both main surfaces with a silver paste and subsequent baking, the silver paste tends to flow and thereby stain the sides of the dielectric ceramic element. In this case, an additional step of removing the silver paste from the sides of the dielectric ceramic element is required, and the manufacturing cost of the ceramic capacitor is increased.

For these reasons, in practice, the electrode is not formed all over both main surfaces of the dielectric ceramic element but is so formed that there is some distance between the edge of dielectric ceramic element and that of the electrode. Hence, the actual dielectric breakdown voltage of the ceramic capacitor is less than the maximum dielectric breakdown voltage shown in FIG. 6.

SUMMARY OF THE INVENTION

It is, therefore, a primary object of the present invention to provide a ceramic capacitor higher in dielectric breakdown voltage compared with any conventional ceramic capacitor.

Another object of the invention is to provide a method of manufacturing a ceramic capacitor higher in dielectric breakdown voltage than any conventional ceramic capacitor.

A ceramic capacitor according to an aspect of the invention is characterized in that it comprises a dielectric ceramic element and electrodes formed on the surface of the dielectric ceramic element, wherein reduced layers are formed underneath the electrodes on the surface of the dielectric ceramic element.

A method of manufacturing a ceramic capacitor is characterized in that it comprises the steps of: preparing the dielectric ceramic element with at least one oxide of a metal as a main ingredient, preparing an electrode material which contains a metal having a stronger oxidizing tendency than the metal oxide in the dielectric ceramic element, and forming the electrodes by applying and subsequently baking the electrode material on the surface of the dielectric ceramic element, and simultaneously reducing the surface of the dielectric ceramic element underneath the electrode.

The reduced layer formed on the dielectric ceramic element is lower in insulation resistance than the portion of the dielectric ceramic element not reduced. Hence, when a voltage is applied to the ceramic capacitor, the potential inclination is not so marked in the edge portion of the electrode.

Hence, according to the present invention, between the edge portions of the two electrode layers, there is less risk of dielectric breakdown then with any conventional ceramic cpacitor, and it is possible to have a ceramic capacitor higher in dielectric breakdown voltage than any conventional ceramic capacitor.

Also, according to the invention, a reduced layer can be formed on the surface of dielectric ceramic element simultaneously with formation of the electrode by the use of an electrode material whose main ingredient is a metal having a marked tendency to be oxidized.

According to the invented method, therefore, ceramic capacitors high in dielectric breakdown voltage can be manufactured quite efficiently.

The aforementioned objects, further objects, features and advantages will become aparent to those skilled in the following art from the detailed description of a preferred embodiment, with reference to the appended drawings.

DESCRIPTION OF A PREFERRED EMBODIMENT

Figure 1:
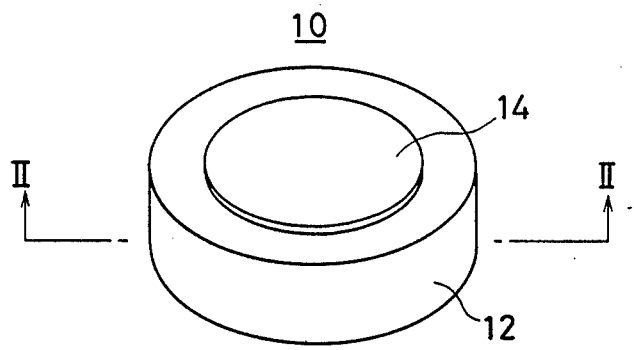
FIG. 1 is a perspective view showing a preferred embodiment of the invention.
Figure 2:
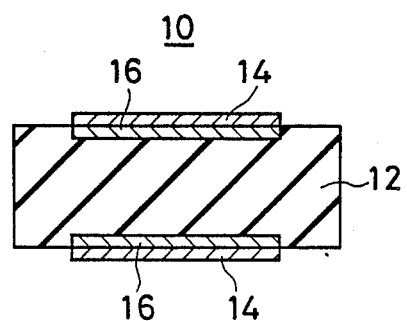
FIG. 2 is a sectional view taken along the line II—II in FIG. 1.

FIG. 1 is a perspective view showing a preferred embodiment of the present invention, and FIG. 2 is a sectional view taken along the line II—II in FIG. 1. This ceramic capacitor 10 includes a dielectric ceramic element 12. As the material of this dielectric ceramic element 12 can be used, for example, barium titanate or strontium titanate. Electrodes 14 are formed on the opposite principal surfaces of the aforementioned dielectic ceramic element 12. These electrodes 14 may possibly be formed on the entire surfaces or may as well be formed so that there is a distance between the edge of the dielectric ceramic element 12 and that of the electrode 14.

Underneath the electrodes 14 on the surface of the dielectric ceramic element 12, there is formed a reduced layer 16. This reduced layer 16 is lower in insulation resistance than the dielectric ceramic element 12.

The first step in the manufacturing process for the aforementioned ceramic capacitor 10 is preparation of the dielectric ceramic element 12. This dielectric ceramic element 12 can be manufactured by forming barium titanate or strontium titanate in a disk-like shape and baking it subsequently. The opposite principal surfaces of this dielectric ceramic element 12 are coated with an electrode paste by, for example, a screen printing method. The electrode paste is composed of a highly oxidation-reactive pulverized metal and glass frits. As the highly oxidative pulverized metal may be used, for example, aluminum powder, nickel powder or copper powder.

The dielectric ceramic element 12 coated with an electrode paste is then dried for approximately 15 minutes in an atmosphere of approximately 150° C. Thereafter the electrode 14 is formed on the dielectric ceramic element, 12 by baking for approximately 2 hours at 830°–860° C. in a non-reducing atmosphe. However, the metal powder in the electrode paste is cut off from the oxygen in the air since the electrode paste contains glass frits. Therefore, underneath the electrode 14 of the dielectric ceramic element 12 is formed a reduced layer 16. This reduced layer 16 is lower in insulation resistance than the unreduced portion of the dielectric ceramic element 12. When, for instance, aluminum powder was used as the pulverized metal contained in the electrode paste and the proportion of glass frits was used not less than 3 weight %, the insulation resistance value of the reduced layer 16 was not more than $10^8$, whereas the insulation resistance value was $10^{12}$–$10^{14}$ in the unreduced portion of the dielectric ceramic element.

Thus, with the ceramic capacitor 10, which has formed therein the reduced layer 16, the potential inclination in the edge portion of the electrode 14 is not so increased, hence it is possible to thereby increase the dielectric breakdown voltage.

In an example of the ceramic capacitor 10, aluminum powder was used as the pulverized metal contained in the electrode metal and the dielectric breakdown voltage was measured with the amount of glass frits being varied. The result, that is, the ratio of the dielectric breakdown voltage of the ceramic capacitor 10 to that of conventional counterparts using silver electrodes, is shown tabulated below. Both the DC dielectric breakdown voltage were measured and AC dielectric breakdown voltage.

TABLE

| Glass frit (Weight %) | 2 | 3 | 4 | 6 | 10 | 20 |
|---|---|---|---|---|---|---|
| Ratio of DC dielectric breakdown voltage | 1.07 | 1.3 | 1.4 | 1.7 | 1.6 | 1.6 |
| Ratio of AC dielectric breakdown voltage | 1.0 | 1.1 | 1.1 | 1.1 | 1.3 | 1.8 |

As seen from the tabulated values (ratios) above, the dielectric breakdown voltage of the ceramic capacitor 10 can be increased by using as the material of the electrode 14 an electrode paste including pulverized metal and glass frits. Especially, by increasing the amount of glass frits in the electrode paste so that it is, not less than 3 weight %, the dielectric breakdown voltage in the ceramic capacitor 10 is markedly increased, and when it is further increased to 20 weight %, the DC dielectric breakdown voltage increased to 1.6 times that of a conventional ceramic capacitor, and the AC dielectric breakdown voltage is 1.8 times that of the conventional counterpart.

Thus, by forming the reduced layer 16 on the underside of the electrode 14, the dielectric breakdown voltage of the ceramic capacitor 10 can be increased.

Figure 3:
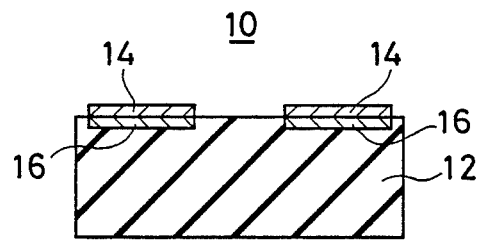
FIG. 3 is a section view showing another embodiment of the invention.
Figure 4:
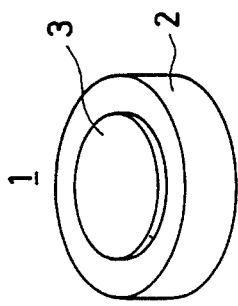
FIG. 4 is a perspective view showing a conventional ceramic capacitor.
Figure 5A:
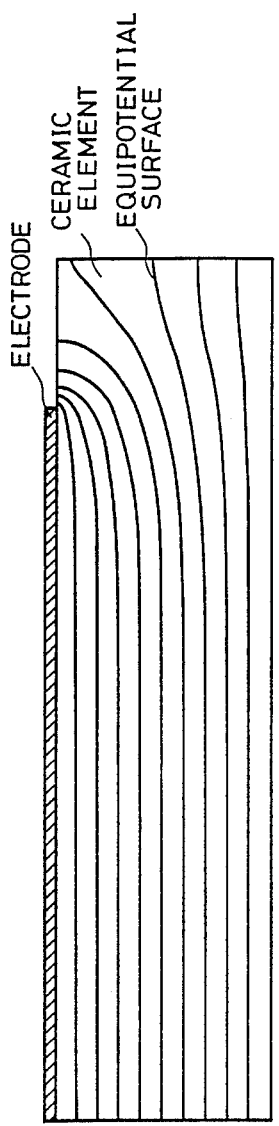
FIG. 5A and FIG. 5B are illustrative views showing the equipotential surfaces near the electrode's edge in two types of ceramic capacitor.
Figure 5B:
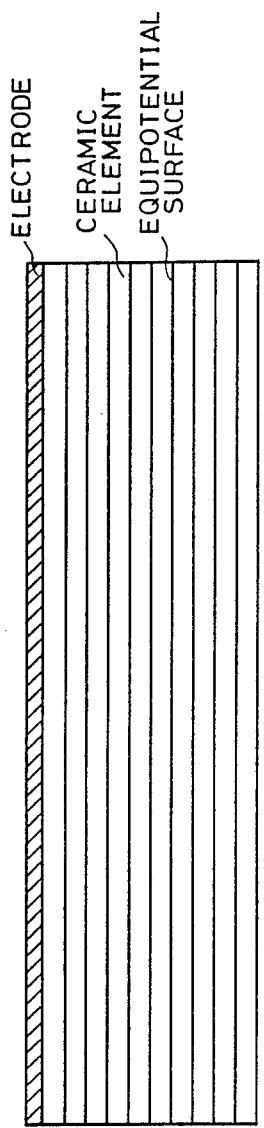
Figure 6:
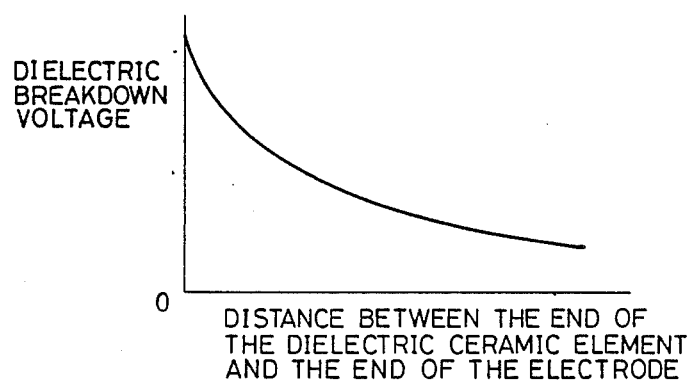
FIG. 6 is a graph showing the relationship between the distance from the edge of the dielectric ceramic element to the edge of teh electrode and the ceramic capacitor's dielectric breakdown voltage.

In the embodiment described above, two electrodes 14 were formed on the opposite principal surfaces of the dielectric ceramic element 12. As shown in FIG. 3, it is also possible to form two electrodes 14 on either principal surface of the dielectric ceramic element 12 at a proper distance therebetween. In this case, too, the reduced layer 16 is formed on the dielectric ceramic element 12 underneath the electrode, and a ceramic capacitor higher in dielectric breakdown voltage than the conventional ceramic capacitor is attainable. The method of reducing the dielectric ceramic element underneath the formed electrode is not limited to the aforementioned embodiments.

Although embodiments of the present invention have been described in detail and illustrated, it is apparent that the foregoing is only for the purpose of illustration and as a preferred embodiment and that the invention is by no means limited thereby, and the spirit and the scope of the present invention is only limited by the appended claims.

What is claimed is:

1. A ceramic capacitor comprising a dielectric ceramic element formed of at least a metal oxide as a main ingredient and electrodes formed on the surface of said dielectric ceramic element, the capacitor having reduced layers underneath said electrodes on the surface of said dielectric ceramic element, wherein said reduced layers are formed by reducing the surface of said dielectric ceramic element by means of applying and subsequently baking on the surface of said dielectric ceramic element an electrode material with a metal having a stronger oxidizing tendency than the mentioned metal oxide.

2. A ceramic capacitor according to claim 1, wherein said electrodes are formed on opposite principal surfaces of said dielectric ceramic element.

3. A ceramic capacitor according to claim 1, wherein said electrodes are formed spaced apart on one principal surface of said dielectric ceramic element.

4. A ceramic capacitor comprising a dielectric ceramic element and electrodes formed on the surface of said dielectric ceramic element, the material of said electrodes being an electro-conductive paste with aluminum powder, nickel powder or copper powder as the main ingredient and also containing glass powder, having reduced layers underneath said electrodes on the surface of said dielectric ceramic element.

5. A ceramic capacitor according to claim 4, wherein the main ingredient of said dielectric ceramic element is selected from the group consisting of strontium titanate-based oxides of metal and barium titanate-based oxides of metal.

6. A ceramic capacitor according to claim 4, wherein said glass powder is contained in a proportion not less than 3 weight %.

7. A method of manufacturing a ceramic capacitor comprising the steps of:
   (a) preparing a dielectric ceramic element with at least one oxide of a metal as a main ingredient;
   (b) preparing an electrode material with a metal having a stronger oxidizing tendency than said oxide of metal as a main ingredient; and
   (c) forming electrodes by applying and subsequently baking said electrode material on the surface of said dielectric ceramic element in a non-reducing atmosphere and simultaneously reducing the surface of said dielectric ceramic element underneath said electrode.

8. A method as in claim 7, wherein the main ingredient of the electrode material is selected from the group consisting of aluminum powder, nickel powder and copper powder, and the electrode material also contains glass powder.

9. A ceramic capacitor according to claim 8, wherein said glass powder is contained in a proportion not less than 3 weight %.

10. A ceramic capacitor according to claim 8, wherein the main ingredient of said dielectric ceramic element is selected from the group consisting of strontium titanate-based oxides of metal and barium titanate-based oxides of metal.

11. A ceramic capacitor according to claim 10, wherein said baking is carried out for approximately two hours at 830°–860° C.

* * * * *